United States Patent
Seppelin et al.

(10) Patent No.: US 10,099,888 B2
(45) Date of Patent: Oct. 16, 2018

(54) DEVICE FOR PROCESSING OPTICAL FIBERS

(71) Applicant: Rosendahl Nextrom Oy, Vantaa (FI)

(72) Inventors: Toni Seppelin, Helsinki (FI); Tomi Dahl, Vantaa (FI)

(73) Assignee: ROSENDAHL NEXTROM OY, Vantaa (FI)

( * ) Notice: Subject to any disclaimer, the term of this patent is extended or adjusted under 35 U.S.C. 154(b) by 56 days.

(21) Appl. No.: 14/726,986

(22) Filed: Jun. 1, 2015

(65) Prior Publication Data

US 2015/0344260 A1 Dec. 3, 2015

(30) Foreign Application Priority Data

Jun. 3, 2014 (FI) ...................................... 20145508

(51) Int. Cl.
*B05C 3/12* (2006.01)
*B05C 13/02* (2006.01)
(Continued)

(52) U.S. Cl.
CPC ............... *B65H 51/10* (2013.01); *B05C 3/12* (2013.01); *B05C 13/02* (2013.01); *C03C 25/005* (2013.01);
(Continued)

(58) Field of Classification Search
None
See application file for complete search history.

(56) References Cited

U.S. PATENT DOCUMENTS 3,117,888 A * 1/1964 Fox .................... D01D 10/0436
118/124
4,127,370 A * 11/1978 Jackson .................. B29C 47/28
425/113
(Continued)

FOREIGN PATENT DOCUMENTS

JP H10-221580 A 8/1998
JP 2007-298970 A 11/2007
(Continued)

OTHER PUBLICATIONS

Nov. 27, 2014 Search Report issued in Finnish Patent Application No. 20145508.
(Continued)

*Primary Examiner* — Binu Thomas
(74) *Attorney, Agent, or Firm* — Oliff PLC

(57) ABSTRACT

The invention relates to a device for processing optical fibers, comprising: a pair of pulleys (1, 2) arranged to receive in a space between them a first optical fiber element (4), and a drive mechanism. In order to obtain a device capable of efficiently and reliably processing optical fibers the first pulley (1) in the pair of pulleys comprises a circumferential first groove (5) in a circumferential contact surface (6) for receiving the first optical fiber element (4), the first groove (5) being shaped to accommodate the first optical fiber element (4) such that less than half of the cross sectional surface area of the first optical fiber element (4) protrudes out of the first groove (5), and a second pulley (2) in the pair of pulleys comprises a circumferential contact surface (7) contacting a surface of the first optical fiber element (4).

6 Claims, 3 Drawing Sheets

(51) Int. Cl.
*B65H 51/10* (2006.01)
*B23F 23/00* (2006.01)
*C03C 25/10* (2018.01)
*C03C 25/005* (2018.01)
*C03C 25/18* (2006.01)
*C03C 25/106* (2018.01)
*B21F 23/00* (2006.01)
*G02B 6/44* (2006.01)

(52) U.S. Cl.
CPC .......... *C03C 25/106* (2013.01); *C03C 25/18* (2013.01); *B21F 23/002* (2013.01); *B65H 2701/32* (2013.01); *G02B 6/4486* (2013.01)

(56) References Cited

U.S. PATENT DOCUMENTS

| | | | | |
|---|---|---|---|---|
| 4,235,362 A | * | 11/1980 | Hubenko | B65H 51/10 226/181 |
| 4,570,571 A | * | 2/1986 | Seagrave | C03C 25/20 118/234 |
| 5,350,102 A | * | 9/1994 | de Muijnck | B65H 51/10 226/174 |
| 6,135,336 A | * | 10/2000 | Linderoth | B65H 51/10 226/108 |
| 7,373,055 B1 | | 5/2008 | Strong | |
| 2004/0003628 A1 | | 1/2004 | Shimazu et al. | |
| 2008/0096764 A1 | * | 4/2008 | Bentley | B05C 3/12 118/68 |
| 2009/0297722 A1 | * | 12/2009 | Faler | C03C 25/106 427/508 |
| 2012/0006087 A1 | * | 1/2012 | Austen | B21C 23/005 226/183 |
| 2013/0136857 A1 | * | 5/2013 | Blanchetiere | B05C 1/06 118/205 |

FOREIGN PATENT DOCUMENTS

| | | |
|---|---|---|
| WO | 00/60393 A1 | 10/2000 |
| WO | 2009/145873 A1 | 12/2009 |
| WO | 2011/144815 A1 | 11/2011 |

OTHER PUBLICATIONS

Oct. 30, 2015 Extended Search Report issued in European Patent Application No. 15170185.1.

\* cited by examiner

DEVICE FOR PROCESSING OPTICAL FIBERS

BACKGROUND OF THE INVENTION

Field of the Invention

This invention relates to a device for processing optical fibers.

Description of Prior Art

Previously there is known a coating process where an optical fiber element is produced by coating several fibers with plastic forming a coating tube around the fibers.

In order to ensure that the plastic of the coating tube is cooled in a controlled manner, the optical fiber element is led into a cooling trough filled with water. The wet optical fiber element is then pulled with a pair of pulleys contacting the outer surface of the optical fiber element, and eventually the optical fiber element is winded up on a reel.

A problem with the above described solution is that the wet optical fiber element is slippery. Additionally, attention needs to be paid to the fact that the pulleys do not direct to much force on the outer surface of the optical fiber element, as too much force may change the shape of the optical fiber element by damaging the coating and possibly also the optical fibers.

As the market tends to continuously require higher and higher line speeds, handling of the optical fiber element has turned out to be challenging. The risk is that the optical fiber element slips out from the space between the pulleys, which results in a production stop and also in a waste of raw-materials.

SUMMARY OF THE INVENTION

An object of the present invention is to obtain a device capable of efficiently and reliably processing optical fibers. This object is achieved with the device according to independent claim 1.

The use of a pair of pulleys where the first pulley has a circumferential first groove accommodating the first optical fiber element such that less than half of the cross sectional surface area of the first optical fiber element protrudes out of the first groove, and of a second pulley having a contact surface contacting a surface of the protruding part of the first optical fiber element, results in a device capable of reliably processing the first optical fiber element at a significant line speed.

Preferred embodiments of the invention are disclosed in the dependent claims.

BRIEF DESCRIPTION OF DRAWINGS

In the following the present invention will be described in closer detail by way of example and with reference to the attached drawings, in which.

DESCRIPTION OF AT LEAST ONE EMBODIMENT

Figure 1:
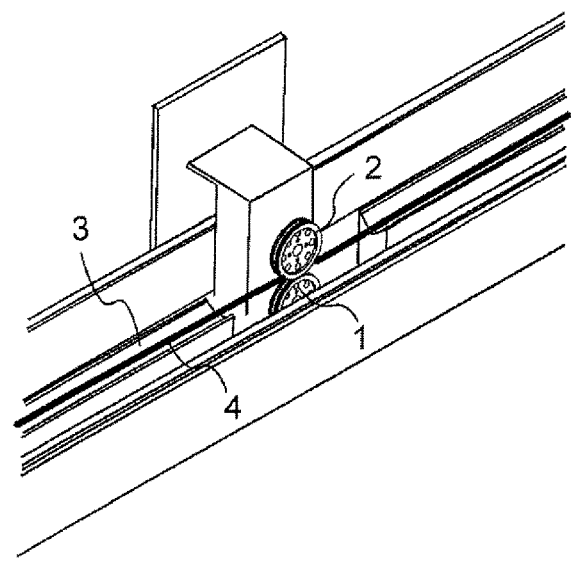
FIGS. 1 and 2 illustrate a first embodiment of a device.
Figure 2:
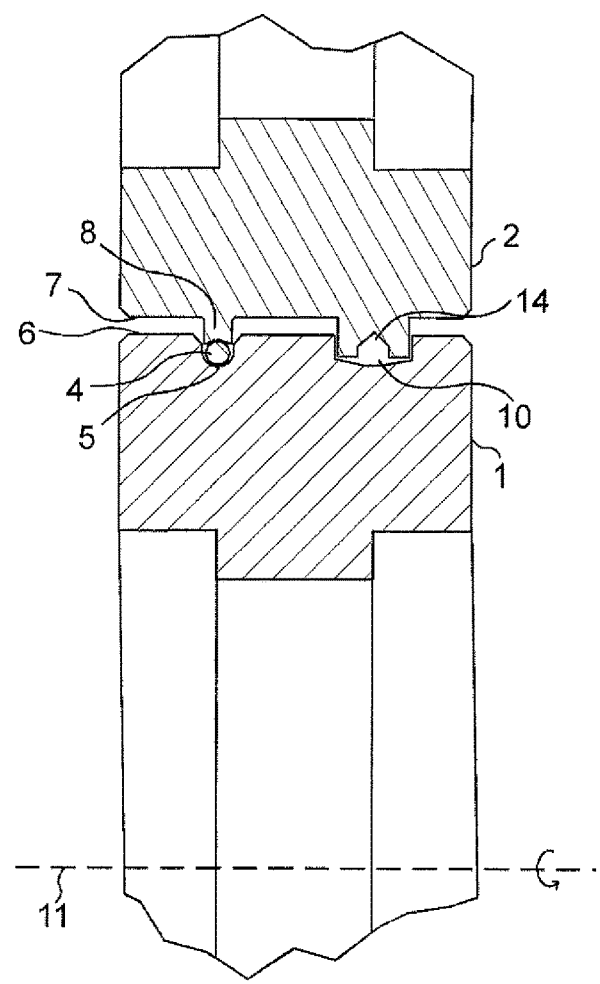

FIGS. 1 and 2 illustrate a first device for processing optical fibers. FIG. 1 illustrates a pair of pulleys arranged in a cooling trough and FIG. 2 illustrates in more detail the shape of these pulleys.

In FIG. 1 a pair of pulleys including a first 1 and a second 2 pulley are arranged to receive a first optical fiber element 4 from a cooling trough 3. The pulleys may be manufactured of a suitable metallic material such as steel or aluminum, for instance. The optical fiber element may comprise one or more optical fibers contained in coating of a suitable plastic material. The cooling trough 3 may be filled with water, for instance, which is utilized for controlling the temperature of the optical fiber element, and in particular of the coating which may have been extruded shortly before feeding the optical fiber element into the cooling trough 3.

A drive mechanism which may comprise an electric motor, for instance, is used for causing the pulleys 1 and 2 to rotate and to pull the first optical fiber element 4 by contact between the outer surface of the first optical fiber element 4 and the circumferential contact surfaces of the pulleys.

The first pulley 1 comprises a circumferential first groove 5 in a circumferential contact surface 6 of the first pulley 1. The first optical fiber element 4 is received in the first groove 5. For this purpose the first groove 5 has been shaped to accommodate the first optical fiber element such that less than half of the cross sectional surface area of the first optical fiber element 4 protrudes out of the first groove 4. In the illustrated example of FIG. 2 the first optical fiber element 4 is entirely accommodated in the first groove, such that the first optical element does not at all protrude out of the first groove 5. The circumferential contact surface 7 of the second pulley 2 has a part 8 protruding into the first groove 5 in the first pulley 6 for contacting the surface of the first optical fiber element 4 and for enclosing the first optical fiber element in a space delimited by the first 1 and second 2 pulleys. For simplicity, the cross section of the first optical fiber element does not separately illustrate the one or more optical fibers and the coating.

As there exists more than one dimension of optical fiber elements, the pair of pulleys illustrated in FIG. 2 is in addition to the first groove provided with a circumferential second groove 14. In the illustrated example the second groove 14 is by way of example arranged in the second pulley 2, though as an alternative, it could be instead arranged in the first pulley 1. The second groove 14 has different dimensions than the first groove 5 such that it can accommodate a second optical fiber element having different cross sectional dimensions than the first optical fiber element 4.

The second groove 14 is dimensioned to receive a second optical fiber element such that less than half of the cross sectional area of the second optical fiber element protrudes out of the second groove. The circumferential contact surface 6 of the first pulley 1 contacts a surface of the second optical fiber element received in the second groove 14. As can be seen from FIG. 2, the second pulley 2 has a circumferential protruding part into which the second groove 14 is arranged. This protruding part protrudes into a circumferential recess 10 in the first pulley 1, which is wide enough to receive the protrusion of the second pulley 2.

The use of a pulley pair having both a first 5 and second groove 14 is advantageous as optical fiber elements with different cross sectional diameters may be pulled with the same pulley pair. However, in most embodiments only one of the grooves is in use at a time, in other words only one optical fiber element is drawn though two grooves exist. The advantage in such an embodiment is that once the processing line is changed for processing an optical fiber element with a different dimension, it is not necessary to change the pair of pulleys, but instead the optical fiber element with the new dimension can be led into the other groove with correct dimensions for pulling this other optical fiber element.

Figure 3:
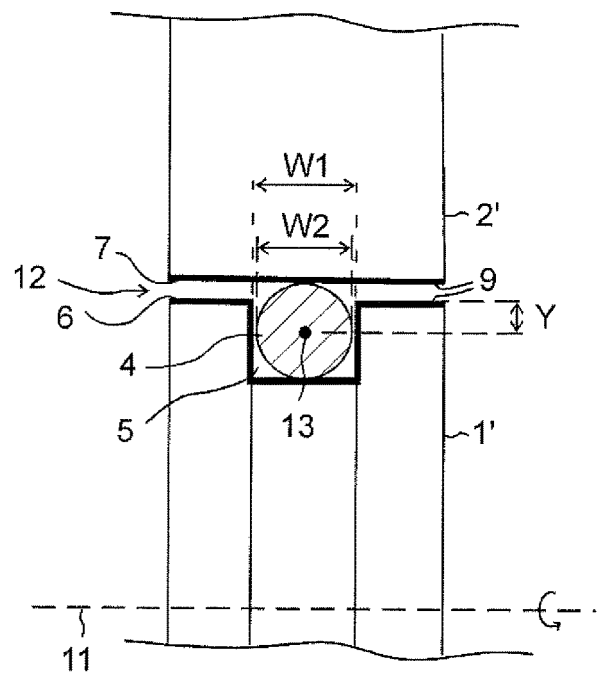
FIG. 3 illustrates a second embodiment of a device.

The contact surfaces 6 and 7 of the first and second pulley 1 and 2 are advantageously at least partly coated with a coating providing roughened high friction contact surfaces. The coating may be arranged as illustrated in FIG. 3, for instance. One alternative is to apply a layer of tungsten carbide by plasma deposition, for instance. Such a layer is very wear resistant. As the object is to increase friction, machining of the layer after deposition can be minimized or in some embodiments completely avoided.

FIG. 3 illustrates a second embodiment of a device. The device of FIG. 3 is very similar to the one explained in connection with FIGS. 1 and 2. Therefore the embodiment of FIG. 3 will be mainly explained by pointing out the differences between these embodiments.

In FIG. 3 the pair of pulleys including the first pulley 1' and the second pulley 2' is provided with only one groove 5. Consequently, this pair of pulleys is optimized for only one size of an optical fiber element 4. FIG. 3 also illustrates the coating 9 providing roughened high friction contact surfaces 6 and 7 for the pair of pulleys, as explained in connection with the embodiment of FIGS. 1 and 2. Such a coating may be utilized also in the other embodiments explained later.

In the embodiment of FIG. 3, the second pulley 2' does not protrude into a groove or recess in the first pulley 1', as in FIG. 2. Instead a gap 12 extending parallel with the rotation axis 11 of the first pulley 1' separates the pulleys 1' and 2' from each other. In the illustrated example, the second pulley 2' has a generally flat contact surface 7 contacting the surface of the first optical fiber element 4. It is, however, possible to utilize a contact surface 7 which is not flat, but slightly concave, for instance, in other words a similar shape as the recess 10 has in FIG. 2, in order to assist the first optical fiber element to stay in the middle part of the groove 5.

FIG. 3 also illustrates the center point 13 in the cross sectional area of the first optical fiber element 4. At the level of the center point 13 in the direction of the rotation axis 11 of the first pulley 1', the width W1 of the first groove 5 substantially corresponds to the width W2 of the first optical fiber element 4. In this connection "substantially corresponds" refers to a dimensioning where the width W1 of the groove 5 is so close to the width W2 of the first optical fiber element 4, that the walls of the groove 5 give adequate support to the first optical fiber element 4 in order to avoid that the shape of the first optical fiber element changes too much from circular to oval, once the first pulley 1' and the second pulley 2' press the first optical fiber element 4 between them with a sufficient force to ensure a good grip between the surface of the first optical fiber element 4 and the contact surfaces 6 and 7. In practice the dimensioning could be implemented such that the width W1 of the groove 5 exceeds the width W2 of the first optical fiber element 4 with up to 20%, preferably 2.5 to 10%. Such dimensioning is optimal at least for optical fiber elements having typically a diameter of 1 to 4 mm. A similar dimensioning is advantageously utilized also in the embodiments of FIGS. 1 to 2 and 4 to 5.

It can also be seen in FIG. 3 that the center point 13 of the cross sectional area of the first optical fiber element 4 is located at a depth Y inside the first groove 5, in other words such that less than half of the cross sectional area of the first optical fiber element protrudes out of the first groove. This ensures that the first optical fiber element 4 is efficiently prevented from slipping out of the space between the pulleys 1' and 2' also in implementations where the first optical fiber element is wet and slippery and the line speed is high.

Figure 4:
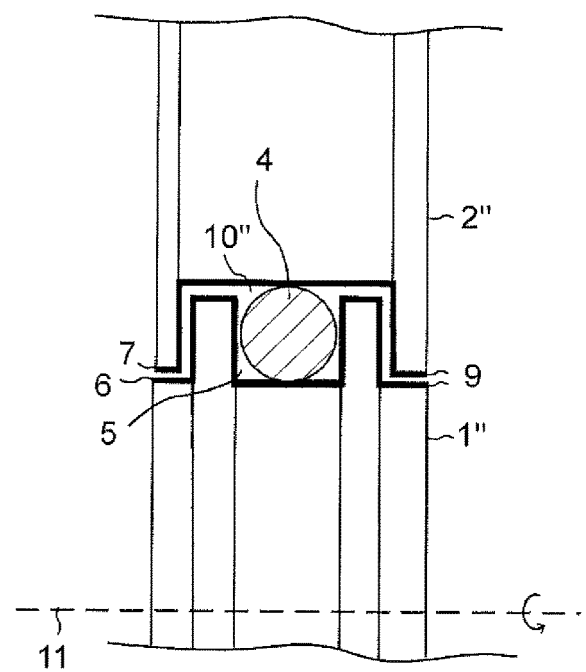
FIG. 4 illustrates a third embodiment of a device.

FIG. 4 illustrates a third embodiment of a device. The embodiment of FIG. 4 is very similar to the one explained in connection with FIG. 3. therefore the embodiment of FIG. 4 will be mainly explained by pointing out the differences between these embodiments.

In FIG. 4 the first groove 5 is arranged in a circumferential protruding part of the first pulley 1". A circumferential recess 10" is arranged in the second pulley 2". The recess is wide enough to facilitate that the protruding part of the first pulley 1" can protrude into the recess 10". Consequently, the first pulley 1" protrudes into the second pulley 2" and the first optical fiber element 4 is enclosed in a space delimited by the first and second pulleys.

Figure 5:
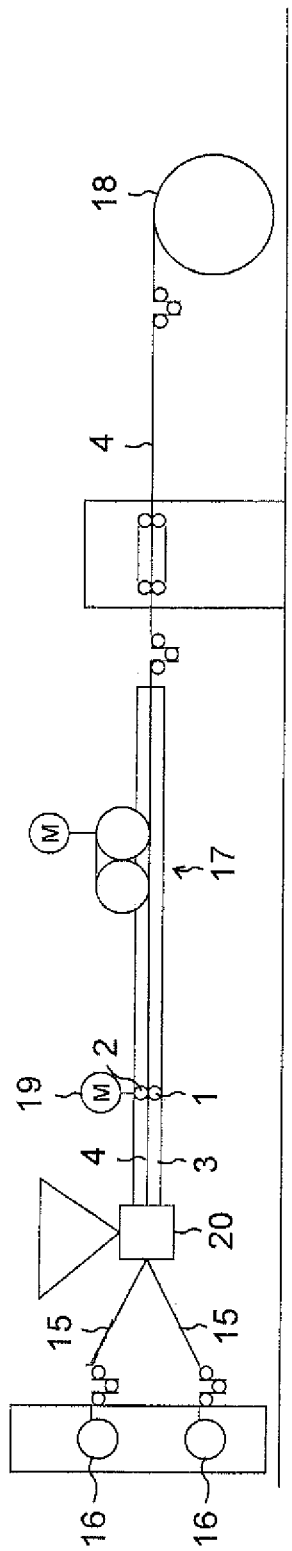
FIG. 5 illustrates a fourth embodiment of a device.

FIG. 5 illustrates a fourth embodiment of a device. The embodiment of FIG. 5 is very similar to the one explained in connection with FIGS. 1 and 2. Therefore the embodiment of FIG. 5 will be mainly explained by pointing out the differences between these embodiments.

In FIG. 5 the pair of pulleys including the first 1 and second pulley 2 which are rotated by a drive mechanism 19 including an electric motor are arranged in connection with a cooling trough 3, as illustrated in connection with FIG. 1. However, instead of utilizing the pulleys 1 and 2 illustrated in FIGS. 1 and 2, the pulleys 1' and 2' or 1" and 2" could be used instead in the embodiment of FIG. 5.

An extruder 20 receiving one or more optical fibers 15 is arranged in front of the cooling trough 3. In the illustrated example the extruder 20 receives two optical fibers 15 from payoff reels 16 and produces a plastic coating to surround the optical fibers 15 in order to produce the first optical fiber element 4. From the extruder 20 the produced first optical fiber element 4 is led into the cooling liquid, preferably water, which is located in the cooling trough 3.

One alternative is that the coating produced by the extruder 20 forms a tube wherein the optical fibers 15 are loosely arranged, in other words, such that they are not attached or embedded in the plastic material of the tube. The tube may, however, be filled with a suitable jelly surrounding the optical fibers in the tube.

The device of FIG. 5 additionally comprises a main capstan 17 which in addition to the pulleys 1 and 2, pulls the first optical fiber element 4. In order to avoid negative effects of post shrinkage, the pair of pulleys 1 and 2 is arranged to pull the first optical fiber element with a higher speed than the capstan. As the plastic material forming the tube tends to shrink from its original dimension once it has cooled, the pair of pulleys 1 and 2 is running at a higher speed in order to stress the tube and to obtain a tube that is slightly longer than the fibers at the location of the pulleys 1 and 2. As the fibers 15 are loose within the tube, they are not stressed by the pulling directed by the pulleys 1 and 2 to the first optical fiber element 4. A length difference called Excess Fiber Length (EFL) is consequently obtained.

Subsequently the main capstan 17 pulls the first optical fiber element 4 by stressing the fibers 15 and the tube equally. This may be accomplished, by winding the first optical fiber element 4 more than one turn around the wheels of the main capstan 17, such that friction between the inside of the tube and the optical fibers within the tube, for instance, temporarily locks the tube to the optical fibers. Finally, the processed first optical fiber element is winded up on a reel 18.

It is to be understood that the above description and the accompanying figures are only intended to illustrate the present invention. It will be obvious to a person skilled in the art that the invention can be varied and modified without departing from the scope of the invention.

The invention claimed is:

1. A device processing optical fibers, comprising:
   an extruder receiving one or more optical fibers and providing a plastic coating as a tube surrounding the one or more optical fibers which are arranged inside the tube without being attached to or embedded in the material of the tube in order to produce a first optical fiber element,
   a cooling trough containing a liquid via which the first optical fiber element is led,
   a pair of pulleys receiving from the cooling trough in a space between them the first optical fiber element, wherein the first optical fiber element received by the pair of pulleys is wet with the liquid from the cooling trough,
   a main capstan arranged after the pair of pulleys to pull the first optical fiber element, and
   a drive mechanism causing the pair of pulleys to rotate and to pull the first optical fiber element by contact between an outer surface of the first optical fiber element and the pair of pulleys with a higher speed than the main capstan for eliminating effects of post shrinkage,
   wherein:
      a first pulley in the pair of pulleys comprises a circumferential first groove in a circumferential contact surface and receiving the first optical fiber element, the first groove being shaped to accommodate in the space between the pair of pulleys the first optical fiber element such that less than half of a cross sectional surface area of the first optical fiber element protrudes out of the first groove,
      a second pulley in the pair of pulleys comprises a circumferential contact surface contacting the outer surface of the first optical fiber element, and
      at a level of a center point in the cross sectional area of the first optical fiber element the first groove has in a direction of extension of a rotation axis of the first pulley a width which exceeds a width of the first optical fiber element by up to 20%.

2. The device according to claim 1, wherein at the level of the center point in the cross sectional area of the first optical fiber element the first groove has in the direction of extension of the rotation axis of the first pulley a width which exceeds the width of the first optical fiber element by 2.5 to 10%.

3. The device according to claim 1, wherein the contact surface of the second pulley has a circumferential part protruding into the first groove in the first pulley for enclosing the first optical fiber element in a space delimited by the first and second pulleys.

4. The device according to claim 1, wherein the contact surface of the second pulley has a circumferential recess and the first pulley protrudes into the recess in the second pulley for enclosing the first optical fiber element in a space delimited by the first and second pulleys.

5. The device according to claim 1, wherein:
   one of the first and second pulleys comprises a circumferential second groove in a circumferential contact surface for receiving a second optical fiber element having different cross sectional dimensions than the first optical fiber element,
   the second groove has different dimensions than the first groove for accommodating the second optical fiber element such that less than half of the cross sectional surface area of the second optical fiber element protrudes out of the second groove, and
   the circumferential contact surface of the other one of the first and second pulley contacts a surface of the second optical fiber element.

6. The device according to claim 1, wherein the circumferential contact surface of at least one of the first and second pulleys is at least partially coated with a coating providing a roughened friction contact surface.

* * * * *